(12) United States Patent
Hall

(10) Patent No.: US 6,757,985 B2
(45) Date of Patent: Jul. 6, 2004

(54) PRECISE POSITIONING OF AN OBJECT

(75) Inventor: Kenneth Frank Hall, Martock (GB)

(73) Assignee: KFH Design Limited, Martock (GB)

( * ) Notice: Subject to any disclaimer, the term of this patent is extended or adjusted under 35 U.S.C. 154(b) by 0 days.

(21) Appl. No.: 10/427,425

(22) Filed: Apr. 30, 2003

(65) Prior Publication Data

US 2003/0204959 A1 Nov. 6, 2003

(30) Foreign Application Priority Data

May 1, 2002 (GB) .............................................. 0209952

(51) Int. Cl.[7] .......................................... G01B 5/004
(52) U.S. Cl. ........................................ 33/503; 901/18
(58) Field of Search .......................... 33/503, 556, 559; 901/16, 18

(56) References Cited

U.S. PATENT DOCUMENTS

| 3,904,042 | A | * | 9/1975 | Colston ....................... 901/15 |
|---|---|---|---|---|
| 4,365,421 | A | * | 12/1982 | Byrum ..................... 33/366.21 |
| 4,634,889 | A | * | 1/1987 | Foggia et al. .................. 901/16 |
| 4,725,193 | A | * | 2/1988 | Sticht ........................... 901/27 |
| 5,102,289 | A | * | 4/1992 | Yokoshima et al. .......... 901/49 |
| 5,105,552 | A | * | 4/1992 | Bielle .......................... 33/503 |
| 5,219,379 | A | * | 6/1993 | Good et al. ................... 33/645 |
| 5,396,714 | A | * | 3/1995 | Sturges et al. ................ 33/644 |
| 5,611,147 | A | * | 3/1997 | Raab ............................ 33/503 |
| 6,246,052 | B1 | * | 6/2001 | Cleveland et al. ............ 33/568 |
| 6,546,643 | B2 | * | 4/2003 | Lotze et al. .................. 33/559 |
| 2001/0025427 | A1 | * | 10/2001 | Lotze et al. .................. 33/559 |

\* cited by examiner

Primary Examiner—G. Bradley Bennett

(57) ABSTRACT

Apparatus for the precise positioning of an object such as a work platform relative to a base, comprising, for each of three orthogonal axes, a flexure coupling between the work platform and the base, at least one of the flexure couplings having a rotary bearing and rotary positioning device where it connects with the work platform or the base.

The apparatus provides precise positioning in up to three orthogonal rotational axes and up to three linear axes, and it is useful in the electro-optics industry.

25 Claims, 4 Drawing Sheets

PRECISE POSITIONING OF AN OBJECT

CROSS REFERENCE TO RELATED APPLICATION

This application hereby claims foreign priority benefits under 35 U.S.C. 119(a)–(d) of foreign application for patent, PCT International Application No. 0209952.1, United Kingdom, filed May 01, 2002, entitled PRECISE POSITIONING OF AN OBJECT.

This invention relates to apparatus for the precise positioning of an object such as a work platform relative to a base, and to a method for positioning an object precisely in three dimensions. The invention is capable of providing equipment for the precise positioning in up to three orthogonal rotational axes and up to three linear axes: this is known as six axis positioning. It is particularly although not exclusively useful in the electro-optics industry.

BACKGROUND TO THE INVENTION

Although devices providing six axis adjustment have uses in various scientific, technical and manufacturing applications, they are of particular interest to the electro-optics industry. For example, during the assembly of devices to which optical fibres are attached, the fibre is positioned to optimise a signal, using a feedback process, before being fixed in place. This positioning will often require multi-axis movement, but with only a small range of travel, as the components of the devices being assembled, and the jigs to hold them, are made accurately. The precision of movements for the positioning process must be of a very high order: movements could need to resolve nanometres of linear travel and arc seconds of angular travel.

With the advent of six axis electronic control, a motorised six axis device can cope with cross-talk between axes, but not with unpredictable motions due to friction, backlash and contaminated lubricants. Also, some six axis devices require all the axes to be power driven to achieve any movements, and this imposes a limitation.

An object of the present invention is to overcome the limitations of prior six axis control mechanisms.

SUMMARY OF THE INVENTION

Accordingly, the present invention provides apparatus for the precise positioning of an object relative to a base, comprising, for each of three orthogonal axes, a flexure coupling between the object and the base, at least one of the flexure couplings having a rotary bearing and rotary positioning device where it connects with the object or the base.

The invention also provides a method of positioning a workpiece precisely in three dimensions by coupling it to a base using three orthogonal flexure couplings and rotating at least one of them.

The invention allows six axis positioning, but may be used with fewer axes of rotary control and/or fewer axes of linear control.

We have discovered that flexure mechanisms have significant advantages in this context over conventional mechanics incorporating rolling or sliding bearings. Embodiments of the invention may be operated manually or may be power driven by any axis, or axes may be left without adjustment means. This gives greater flexibility than has been provided by some power driven six axis devices in the past.

Flexure type shaft couplings are of course well known in other technical fields, for coupling a driving and a driven shaft together, for example a motor and a machine spindle. The purpose of the coupling is to allow for angular or linear misalignment and for variations in the separation of the shafts, yet to provide a torsionally stiff connection. Forces resulting from the misalignment have to be kept low to avoid additional shaft bearing loads. This high torsional stiffness and low flexural stiffness in bending and extension of a flexure coupling is used, in the present invention, to produce a simple means of supporting and positioning an object that can be adjusted in up to six axes. Of the two types of flexure shaft couplings in common use, the bellows type is to be preferred over the helical beam type for this application, as the range of movement is much greater, but any type of flexure shaft coupling could be used.

In the context of this invention, the term "shaft coupling" refers essentially to the flexure part of the coupling, and the ends fitted to the flexure section for attachment to shafts may or may not be required.

A single bellows, or equivalent, coupling can be replaced by two or more units, with their axes parallel. This arrangement is an alternative to the use of single large diameter couplings where space is limited.

BRIEF DESCRIPTION OF THE DRAWINGS

In order that the invention may be better understood, preferred embodiments will now be described, by way of example only, with reference to the accompanying drawings, in which.

DETAILED DESCRIPTION OF PREFERRED EMBODIMENTS

Figure 1:
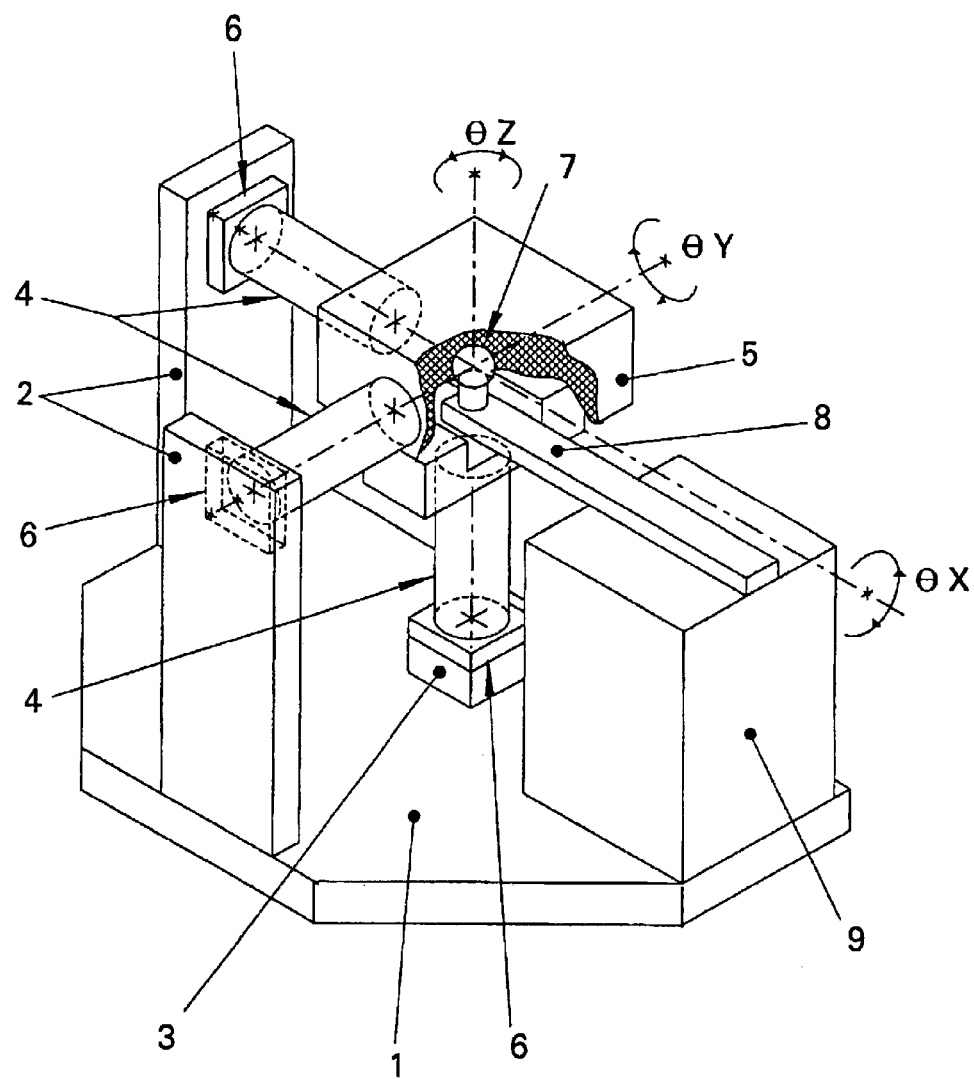
FIG. 1 is a perspective view, partly broken away, of a first embodiment of the invention, with some parts omitted for clarity.

A first embodiment of the invention is shown in FIG. 1. A baseplate 1 is attached to two rigid uprights 2 and a block 3. A work platform 5, in the form of a hollow rectangular box, is supported on a close-fitting ball joint 7, the outer component of which is not shown but is connected rigidly to the platform 5.

Three bellows devices 4, preferably positioned on mutually perpendicular axes X, Y and Z for rotation, are rigidly attached to the work platform 5 on its outer surfaces, and at their other ends to the uprights 2 and block 3 respectively through rotary bearings 6, each having means of angular adjustment such that the work platform 5 is rotatable by means of the bellows devices 4. Precision bellows and assembles appropriate for use in this context are for example manufactured by Hydroflex, a division of Caradon Mira Limited, in Cheltenham, Gloucestershire, England. Such Hydroflex metal bellows are precision components which have been deep drawn and hydraulically formed from strip metal. They range in outside diameter from about 8 mm to about 125 mm and are available in brass, phosphor bronze, stainless steel or monel metal. The shaft couplings provide constant velocity drives allowing for angular and lateral shaft misalignment of typically up to 50°.

The ball 7 of the ball joint is preferably positioned on or near the intersection of the three bellows axes. The ball itself is attached, in this example, to a rigid shaft 8 which is either fixed to the baseplate 1 or, if linear movements are also required, to a linear positioning device 9 as shown, which is itself attached to the baseplate 1. The linear positioning device 9 is operable either manually or electrically, to adjust the linear position in one, two or three dimensions.

The bellows devices 4 provide flexure couplings which are very rigid rotationally but very flexible. When one of them is rotated, the other two readily flex to accommodate this movement. This causes movement of the work platform 5 about the ball joint 7. The ball joint 7 itself may be translated relative to the baseplate 1, independently of the flexure couplings.

Figure 2:
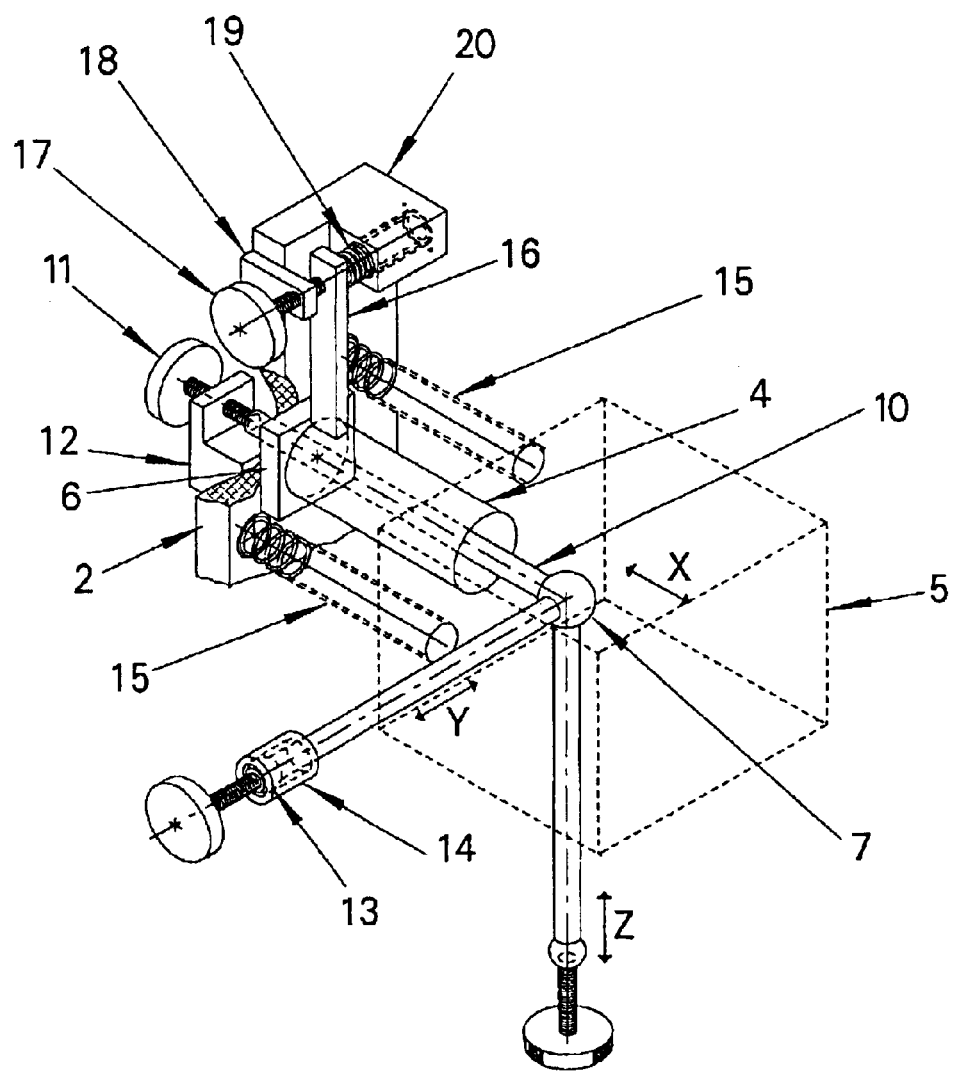
FIG. 2 is a perspective view of apparatus embodying the invention which may be used with the embodiment of FIG. 1 or may be used as a second embodiment.

Although not shown in FIG. 1, a mechanism 16–20 is illustrated in FIG. 2 for rotating the bellows devices 4. This could be incorporated in the apparatus of FIG. 1. A tangent arm 16 is rigidly attached to the bellows adjacent the rotary bearing 6. At the free end of the tangent arm 16, a screw 17 operating in a nut 18 bears against the tangent arm 16. On the opposite side of tangent arm 16 to screw 17, a compression spring 19 bears against the tangent arm 16 to act as a return spring. This spring is located in a housing 20, which with nut 18 is rigidly attached to the upright 2.

Turning the screw 17 thus cranks the tangent arm 16 and rotates the bellows 4, with any free play taken up by the resilient bias of the compression spring 19.

A second embodiment of the invention is shown in FIG. 2. This apparatus does not include the linear positioning device 9 nor the rigid shaft 8. It does include the baseplate 1, uprights 2 and block 3, but these are mostly omitted for the sake of clarity. Only one of the three bellows devices 4 is illustrated, the other two being omitted for clarity. The main difference between the apparatus of FIG. 2 and that of FIG. 1 is in the way in which linear adjustability is provided. A rigid rod 10 is provided on each of the three orthogonal rotation axes X, Y and Z, touching but not attached to the ball 7. Each rod 10 is free to move axially and to swivel through small angles, pivoting about a point 13 in a sleeve bearing 14 in an upright 2 or in the block 3.

Each rod 10 is moved axially by an actuating mechanism, a simple example of which is illustrated. A screw 11, allowing manual linear adjustment, operates in a nut 12 which is rigidly attached to an upright 2 or to the block 3. All three axes are similarly equipped. To remove backlash, tension springs 15 are provided to pull the work platform 5 towards the corresponding upright 2 or block 3. The tension springs 15 provide a resilient bias which maintains contact between the rods 10 and the ball 7 at one end and with the screw 11 at the other end.

For each of the bellows devices 4, there is a rotary positioning device 16 to 20, one of which is shown in FIG. 2 and has been described above with reference to FIG. 1.

It will be appreciated that each of the devices shown in FIGS. 1 and 2 operates in a similar manner. Since the bellows are torsionally stiff, no free rotation can take place along any axes, so the platform is held rigidly on all three rotational axes. With the ball support in place, no linear motion is possible unless the ball moves, but angular motion can take place by rotating the appropriate bellows. The other two bellows bend to accommodate this motion with low resistance. Linear motion, by whichever method it is achieved, can be in addition to the angular motions, as the extra bellows motions are all low-resistance types.

Figure 3:
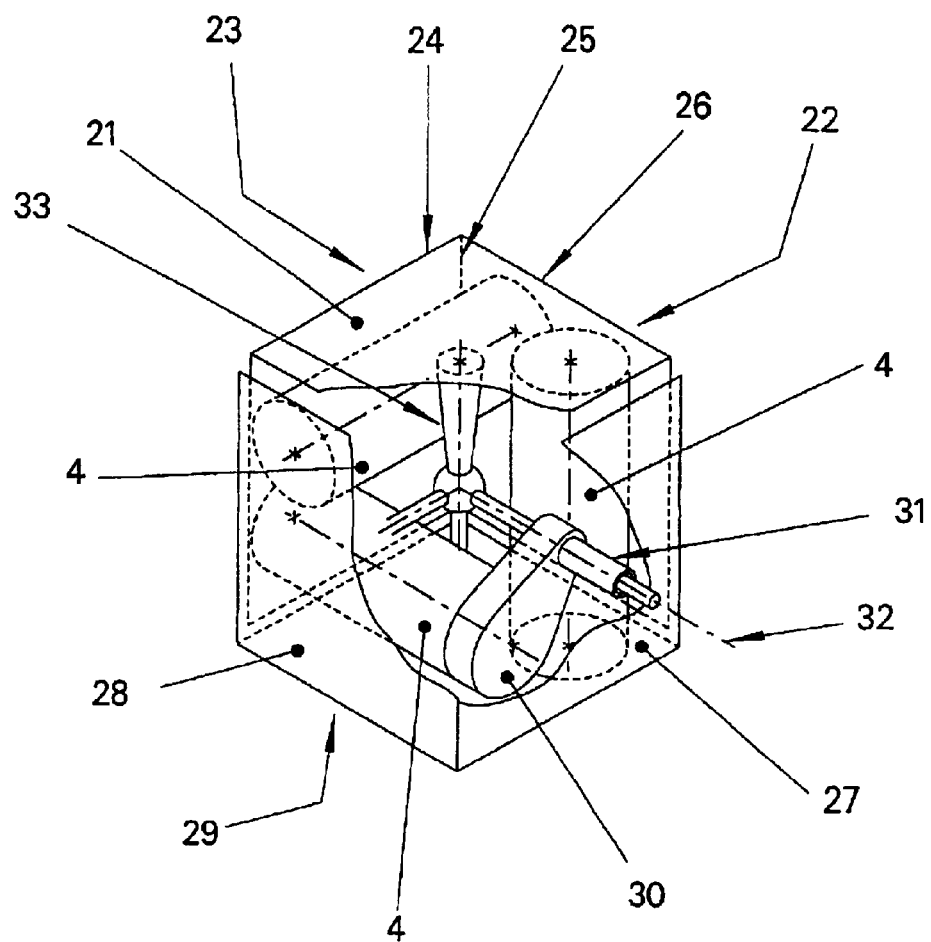
FIG. 3 is a perspective view, partly broken away, of a central portion of a third embodiment of the invention.

A third embodiment of the invention is illustrated in FIG. 3, in which the baseplate 1, uprights 2 and block 3 are omitted for clarity. The work platform takes the form of an open polygon with three sides: three rigid plates 21, 22 and 23 attached at their edges 24, 25 and 26 to make a trihedral assembly. One end of each of the bellows 4 is rigidly attached to one of these plates. The base unit consists of three rigid plates 27, 28 and 29 assembled as a trihedral assembly, in the same way as the work platform. The base unit and the work platform co-operate to form substantially a hollow polygon, in this example substantially a cube. There are of course air spaces between the two assemblies to allow for sufficient relative movement.

The axis of each of the bellows 4 is, in this example, offset relative to its axis of rotation. This arrangement is more compact than the arrangements of FIGS. 1 and 2.

The end of each bellows 4 which is not fixed to the work platform 21 to 23 is rigidly attached to a link 30 (only one of which is shown) which has a bearing spigot 31 integral with it. The bearing spigot 31 fits into precision bearings (not shown) attached to a corresponding wall of the base unit 27 to 29. The spigot rotates about an axis 32 parallel to the axis of the corresponding bellows.

Rotation of the spigot 31 causes rotation of the work platform about the spigot axis 32 via the link 30 and the attached bellows 4. Axes not requiring rotation can have the appropriate bellows attached rigidly at both ends.

The rotation mechanisms for the spigots 31 are not shown in FIG. 3, but could be the same as or similar to the arrangement 16 to 20 illustrated in FIG. 2.

Linear motion may be applied to the ball 7 in the same way as in the example of FIG. 2, the ball 7 being attached rigidly to the work platform by a spigot 33. Tension springs 15 of FIG. 2 or their equivalent would be provided on each linear axis mechanism of FIG. 3.

Figure 4:
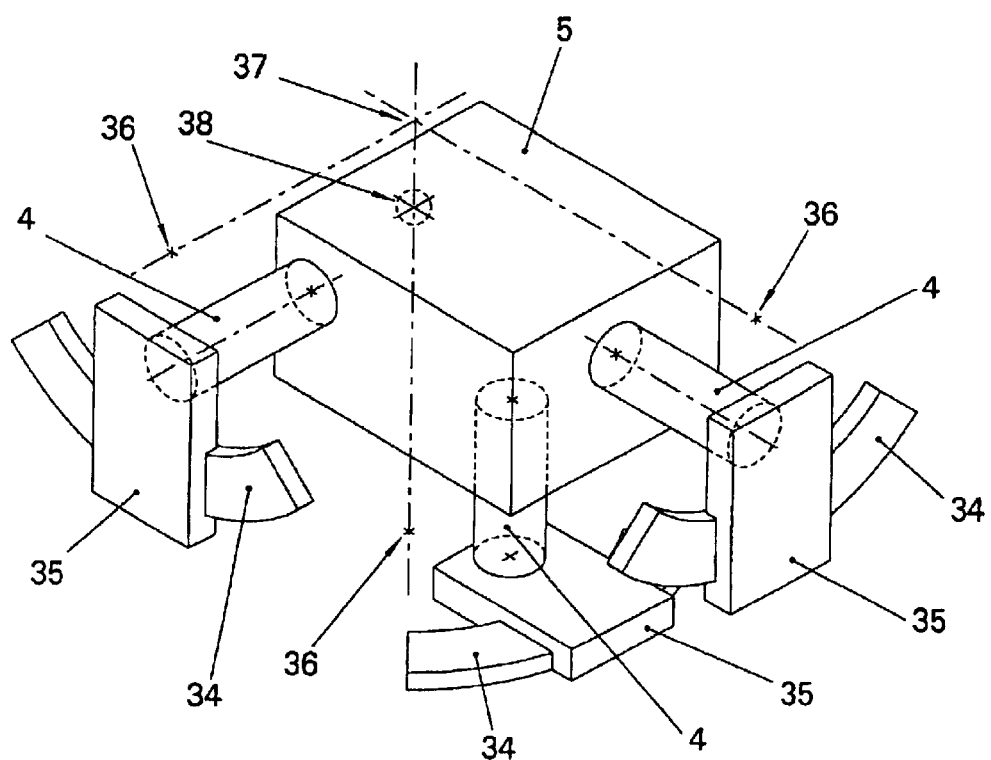
FIG. 4 is a perspective view of part of a fourth embodiment of the invention.

A fourth embodiment of the invention is shown in FIG. 4, in which the intersection of the rotational axes 36 at point 37 is external to the work platform 5 which in this example is a hollow box. This configuration is desirable if the rotational adjustments are to be made about a particular point in free space, for example the tip of an optical fibre.

Instead of the links-30 and bearing spigot 31 of the example of FIG. 3, there are three precision track mechanisms 34 fixed to a rigid base structure. Precision carriages 35 are mounted on the track 34, and allow for three arcs of rotational movement. A bellows 4 is rigidly attached to each carriage 35 at one end and to the work platform 5 at the other end. The centre of curvature of the track 34 corresponds to the axis 36 of rotation of the bellows 4, and is parallel to but spaced from the axis of the bellows. To minimise the amount of flexing required of the bellows, the attachment to the platform 5 should be as near as possible to the axis intersection point 37.

Movement of the carriages 35 causes the work platform 5 to rotate about the intersection point 37, which as has been described above is the point of intersection of the axes through the centres 36 of the related arcs 34. The rotational movement is transmitted through the torsionally rigid bellows 4. Carriage movement can be produced by using a tangent arm arrangement 16 to 20 similar to or the same as that shown in FIG. 2.

Linear motion can be applied to the work platform at the ball joint point 38 using the mechanism illustrated in FIG. 1 or 2, but with the point of application of the linear movement not coincident with the intersection 37 of the rotation axes. Point 38 should be as near to point 37 as possible, to minimise interaction during the alignment process.

It will be appreciated that, using the present invention, six axes of movement can be achieved using low cost components, compared with conventional constructions requiring dedicated linear and rotary devices for each axis. The linear and rotary adjustment mechanisms may all be attached to the frame of the device and not necessarily to the work platform, thus decoupling the work platform. In this way, vibrations or defections caused by operation of the adjustment mechanisms will be minimised.

The bellows, or equivalent components, require no lubrication and have a very long life as no friction or wear takes place in use. They are ideal for use in a high vacuum. The apparatus can be scaled up or down over a very wide range, and bellows, for example, are readily available from 8 mm to over 100 mm diameter, as described above.

Axes may be fitted with manual or power driven actuators, or without any adjusting means, to suit the particular application required. This can significantly reduce the cost of the complete device.

A wide range of bellows is available for use with the invention, so that, for a given specification, the design can be optimised to minimise cross-talk arising from the fact that the bellows are not absolutely rigid in torsion and are not completely free in bending and extension. When motorised systems with feedback are applied, the disadvantage of cross-talk can be far outweighed by the lack of backlash in the flexure device, and by its high resolution.

Many alternative components and constructions could be used in place of those described with reference to the drawings. For example, the ball joint could be replaced with a block containing hemispherical- pockets, or indeed any structure constituting an angular pivot bearing.

What is claimed is:

1. Apparatus for the precise positioning of an object relative to a base, comprising, for each of three orthogonal axes, a flexure coupling between the object and the base, at least one of the flexure couplings having a rotary bearing and rotary positioning device where it connects with the object or the base.

2. Apparatus according to claim 1, in which each flexure coupling has a rotary bearing and rotary positioning device where it connects with the object or the base, whereby to position the work platform in the three orthogonal rotational axes.

3. Apparatus according to claim 1, in which the flexure coupling or each flexure coupling is a bellows.

4. Apparatus according to claim 1, comprising a linear positioning device coupling the object to the base independently of the flexure couplings.

5. Apparatus according to claim 4, in which the linear positioning device is operable to translate the object relative to the base selectively in three orthogonal axes to provide three axes of linear adjustability.

6. Apparatus according to claim 4, in which the linear positioning device is coupled to the object by an angular pivot bearing.

7. Apparatus according to claim 6, in which the angular pivot bearing is a ball joint.

8. Apparatus according to claim 1, in which the object comprises a hollow framework coupled externally to the flexure couplings.

9. Apparatus according to claim 6, in which the object comprises a hollow framework coupled externally to the flexure couplings and in which the angular pivot bearing is inside the hollow framework.

10. Apparatus according to claim 6, in which the axes of the flexure couplings intersect substantially at the angular pivot bearing.

11. Apparatus according to claim 8, in which the axes of the flexure couplings intersect within the hollow framework.

12. Apparatus according to claim 6, comprising at least one linearly adjustable coupling between the angular pivot bearing and the base, independent of the flexure couplings.

13. Apparatus according to claim 12, in which there are three such linearly adjustable couplings substantially orthogonal to each other.

14. Apparatus according to claim 12, in which the or each linearly adjustable coupling is substantially coaxial with a corresponding flexure coupling.

15. Apparatus according to claim 12, in which the or each linearly adjustable coupling bears against the ball of the angular pivot bearing and is resiliently biased against it by a resident coupling between the object and the base.

16. Apparatus according to claim 1, in which the object and the base are each partial polygons and they co-operate to form substantially a hollow polygon.

17. Apparatus according to claim 16, in which the flexure couplings are within the polygon.

18. Apparatus according to claim 16, comprising a linear positioning device or a linearly adjustable coupling, coupling the object to the base independently of the flexure couplings, coupled to the object by an angular pivot bearing inside the polygon.

19. Apparatus according to claim 18, in which each flexure coupling is coupled to the base or to the object by a rotary bearing connected to a spigot such that the axis of rotation of the spigot in the bearing is parallel to but spaced from the axis of the flexure coupling.

20. Apparatus according to claim 18, comprising at least one linearly adjustable coupling between the angular pivot bearing and the base, independent of the flexure couplings.

21. Apparatus according to claim 20, in which the linearly adjustable coupling is coaxial with the spigot axis of rotation.

22. Apparatus according to claim 7, comprising three said rotary positioning devices, external to the object, whose axes intersect at a point outside the object.

23. A method of positioning an object precisely in three dimensions by coupling it to a base using three orthogonal flexure couplings and rotating at least one of them.

24. A method according to claim 23, further comprising translating the object relative to the base, in up to three orthogonal directions.

25. A method according to claim 24, in which the three orthogonal directions are parallel to respective axes of the three orthogonal flexure couplings.

* * * * *